United States Patent [19]

Kokubo

[11] Patent Number: 4,933,931
[45] Date of Patent: Jun. 12, 1990

[54] INTEGRATED ACCOUNTING SYSTEM
[75] Inventor: Yuji Kokubo, Yokohama, Japan
[73] Assignee: Fujitsu Limited, Kawasaki, Japan
[21] Appl. No.: 366,484
[22] Filed: Jun. 15, 1989
[30] Foreign Application Priority Data Jun. 17, 1988 [JP] Japan .................. 63-150836

[51] Int. Cl.$^5$ .......................................... H04L 11/00
[52] U.S. Cl. ................................. 370/60; 370/94.1; 379/112
[58] Field of Search .................. 370/60, 60.1, 94.1; 379/143, 144, 155, 112, 91, 146, 150, 153

[56] References Cited

U.S. PATENT DOCUMENTS

| 4,507,782 | 3/1985 | Kunimasa et al. | 370/60 |
| 4,577,061 | 3/1986 | Katzeff et al. | 379/91 |
| 4,723,238 | 2/1988 | Isreal et al. | 370/60 |

FOREIGN PATENT DOCUMENTS

| 0206111 | 12/1986 | European Pat. Off. | 370/60 |
| 144049 | 7/1985 | Japan . | |
| 0030148 | 2/1986 | Japan | 370/60 |
| 0079342 | 4/1986 | Japan | 370/60 |
| 0294155 | 11/1988 | Japan | 370/60 |

Primary Examiner—Douglas W. Olms
Assistant Examiner—Alpus H. Hsu
Attorney, Agent, or Firm—Staas & Halsey

[57] ABSTRACT

An integrated accounting system is applied to a network structure which includes a telephone network and a packet network. A packet exchange in the packet network includes a circuit for measuring a communication data quantity within the packet network during a communication between a first terminal which has an advance payment function and is connected to a telephone exchange in the telephone network and a second terminal which is a packet mode terminal connected to the packet exchange. The packet exchange also includes a circuit for sending a control signal to a gate way which couples the telephone exchange and the packet exchange every time a measured communication data quantity reaches a predetermined accounting unit of the telephone network, and a circuit for initially sending the control signal when a call out from the first terminal is detected. The telephone exchange includes a circuit for generating a control signal for every predetermined acocunting unit which is dependent on a duration and distance of a communication within the telephone network, a circuit for sending the control signal generated therein and the control signal received from the gate way to the first terminal, and a circuit for initially sending the control signal when a call out from the first terminal is detected. The first terminal collects an amount of money responsive to the control signal received from the telephone exchange.

15 Claims, 12 Drawing Sheets

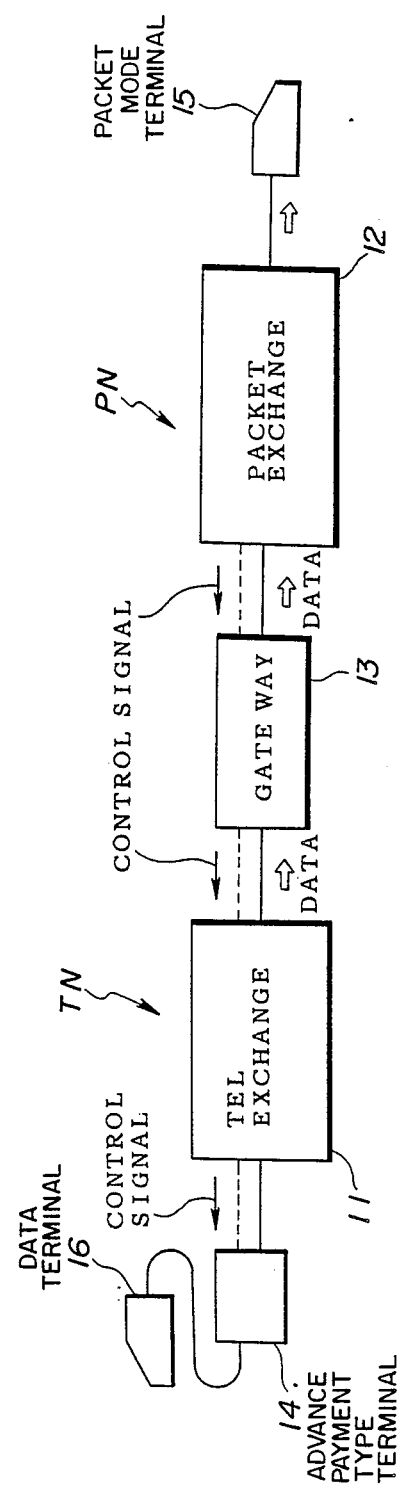

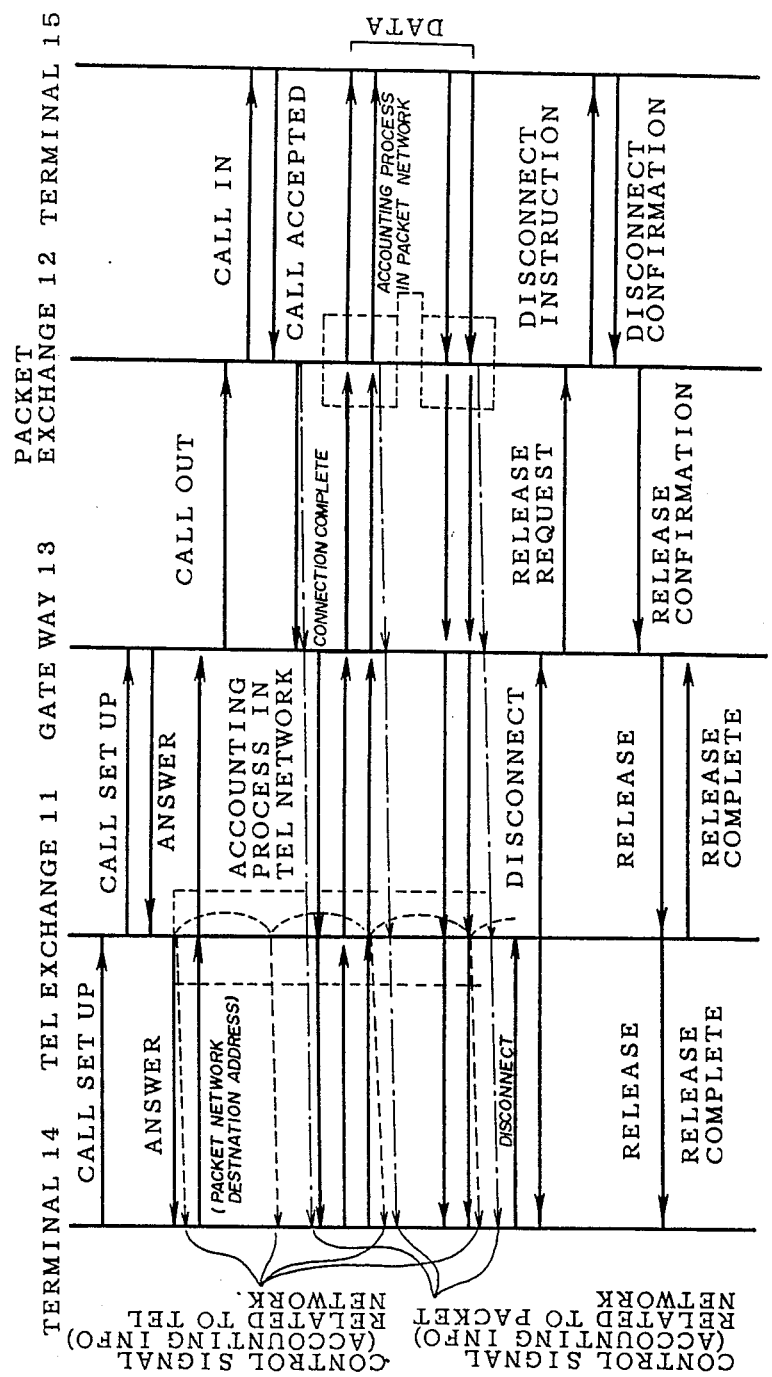

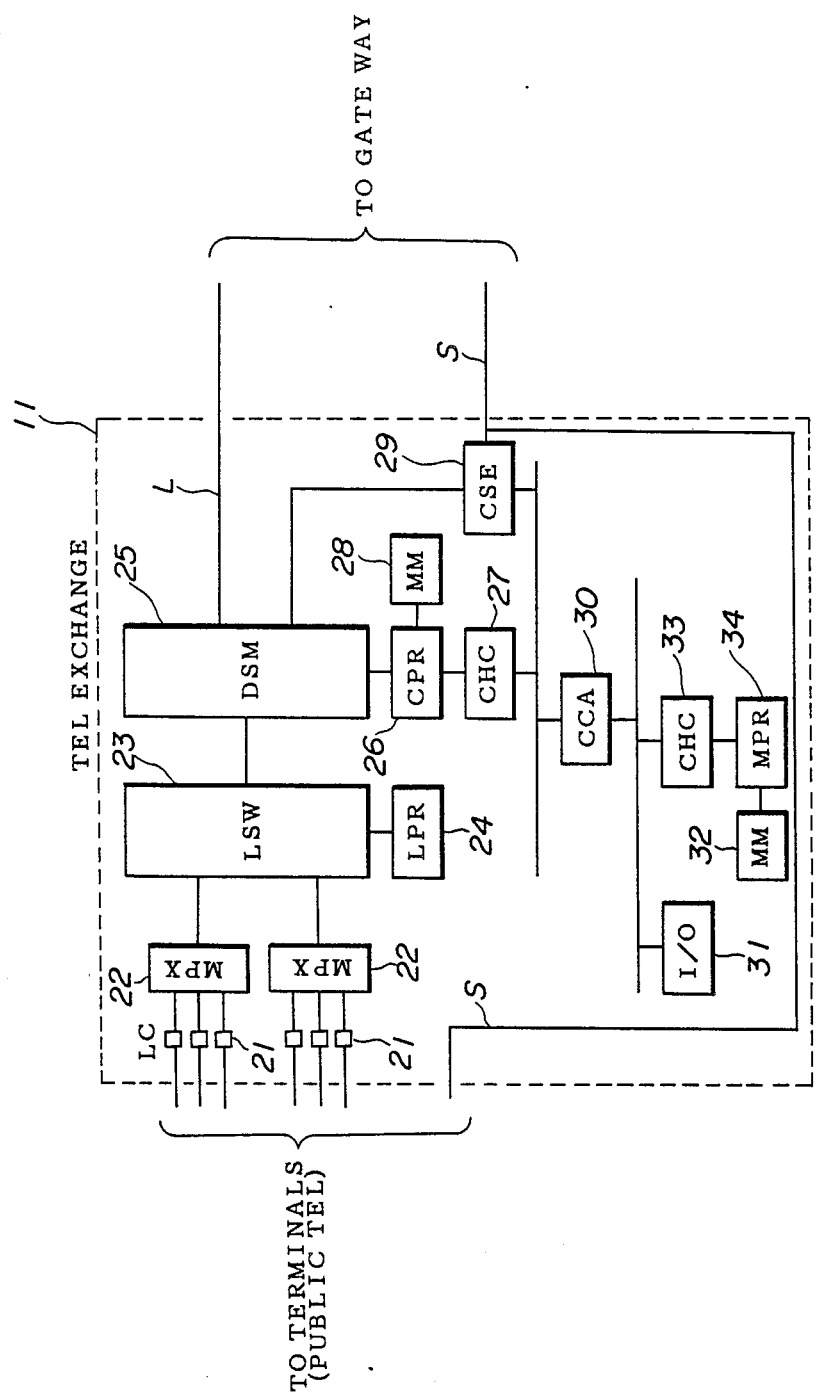

INTEGRATED ACCOUNTING SYSTEM

BACKGROUND OF THE INVENTION

The present invention generally relates to accounting systems, and more particularly to an integrated accounting system applicable to a network structure which includes a telephone network and a packet network.

Recently, due to the development of public telephone sets, card type public telephone sets are becoming popular in addition to conventional coin type public telephone sets. According to the card type public telephone set, a card is recorded with a predetermined number of units and a number of units corresponding to a charge on a call is subtracted from the card instead of collecting inserted coins. In other words, the card type public telephone set also employs an advance payment system and the number of units corresponding to the charge on the call is subtracted from the card responsive to an account signal received from a telephone exchange. On the other hand, there is an increasing demand to connect a data terminal to the card type public telephone set so as to make a data communication. In addition, with the extension of the telephone exchange network, there is a demand to make a data communication with a packet mode terminal of a packet exchange network.

FIG. 1 generally shows an example of a conventional network structure which includes a telephone network and a packet network. The network structure shown includes a telephone network TN, a packet network PN, a telephone exchange 1 within the telephone network TN, a packet exchange 2 within the packet network PN, a gate way 3, an advance payment type terminal 4, a packet mode terminal 5, and a data terminal 6.

The telephone exchange 1 has an accounting function of charging a fee for a telephone call depending on a conversation time (that is, duration) and distance of the telephone call. With respect to the terminal 4 such as a card type public telephone set, the telephone exchange 1 also has a function of sending a control signal for counting up an accounting number for every accounting unit which is dependent on a duration and distance of the telephone call within the telephone network TN. The terminal 4 has a function of subtracting the fee of the telephone call from the card or collecting coins amounting to the fee of the telephone call every time the control signal is received.

On the other hand, the packet exchange 2 has a function of charging a fee for a data communication depending on an information quantity of the data communication within the packet network PN. The packet exchange 2 also has a function of sending a control signal for accumulating the accounting information when the call is disconnected. The gate way 3 has a function of transmitting and receiving control signals between the telephone exchange 1 and the packet exchange 2, and sends to the telephone exchange 1 a control signal dependent on the accounting information from the packet exchange 2.

In the above described network structure, the terminal 4 which is connected to the telephone network TN calls out for the packet mode terminal 5 which is connected to the packet network PN, for example, so as to make a communication via the gate way 3 and the packet network PN. A conventional method of accounting employs an independent accounting system in which the accounting related to the telephone network TN and the accounting related to the packet network PN are made independently. In other words, the accounting related to the telephone network TN is made in the telephone exchange 1 while the accounting related to the packet network PN is made in the packet exchange 2. According to this independent accounting system, only the accounting related to the telephone network TN can be collected from the advance payment made at the terminal 4. The accounting related to the packet network PN is saved in the packet exchange 2 and the user is later charged based thereon. Hence, the user who wishes to make access to the packet network PN from the terminal 4 must be a registered user so that the accounting related to the packet network PN may be later charged, and the user must identify himself by entering his user identification number, for example. As a result, there is a problem in that the access to the packet network PN from the terminal 4 can only be made by a registered user who is authorized to make the access. In addition, there is a problem in that the charge on the communication is made independently for the telephone network TN and the packet network PN at different times, thereby making the network structure not very user-friendly.

FIG. 2 is a time chart for explaining the conventional accounting method employing the independent accounting system.

On the other hand, there is a conventional accounting method employing an integrated accounting system. According to the integrated accounting system, the accounting related to the telephone network TN is made in the telephone exchange 1 while the accounting related to the packet network PN is made in the packet exchange 2, and the accounting related to the packet network PN is added to the accounting related to the telephone network TN in the gate way 3 or the telephone exchange 1. The sum of the accountings related to the telephone network TN and the packet network PN is collected from the payment made at the terminal 4. However, the accounting information related to the packet network PN is obtained from the packet exchange 2 only after the call is disconnected, as is the case of the independent accounting system described above, and it is impossible to determine during the communication whether or not an advance payment should be collected in respect of the accounting related to the packet network PN. As a result, there is a problem in that the integrated accounting cannot be made in real-time. Since the coin type and card type public telephone sets are designed to collect an advance payment for each call, the conventional integrated accounting system which does not collect the charge for the call in real-time is not applicable to these public telephone sets. If the conventional integrated accounting system were to be applied to the public telephone set, the access to the packet network PN from the terminal 4 must be restricted to a registered user so that the collection of the charge for the communication using the packet network PN is guaranteed.

FIG. 3 is a time chart for explaining the conventional accounting method employing the integrated accounting system.

SUMMARY OF THE INVENTION

Accordingly, it is a general object of the present invention to provide a novel and useful integrated accounting system in which the problems described above are eliminated.

Another and more specific object of the present invention is to provide an integrated accounting system for a network structure which includes a telephone network and a packet network, comprising a telephone exchange within the telephone network, a packet exchange within the packet network, a gate way coupling the telephone exchange and the packet exchange, a first terminal having an advance payment function and coupled to the telephone exchange, where the first terminal includes collecting means for collecting an amount of money, and a second terminal coupled to the packet exchange, the second terminal being a packet mode terminal. The packet exchange includes means for measuring a communication data quantity within the packet network during a communication between the first and second terminals, means for sending a control signal to the gate way every time a measured communication data quantity reaches a predetermined accounting unit of the telephone network, and means for initially sending the control signal when a call out from the first terminal is detected. The telephone exchange includes means for generating a control signal for every the predetermined accounting unit which is dependent on a duration and distance of a communication within the telephone network, means for sending the control signal generated therein and the control signal received from the gate way to the first terminal, and means for initially sending the control signal when a call out from the first terminal is detected. The collecting means of the first terminal collects the amount of money responsive to the control signal received from the telephone exchange. According to the integrated accounting system of the present invention, it is possible to realize an advance payment system which collects a sum of the accounting related to the communication in the telephone network and the accounting related to the communication in the packet network in real-time. Hence, the use of the packet network from a terminal having the advance payment function is not restricted to a registered user, and an arbitrary user can make access to the packet network from such a terminal. The network structure also becomes user-friendly in that the charges for the communication in both the telephone network and the packet network are integrated into one and collected at the same time.

Other objects and further features of the present invention will be apparent from the following detailed description when read in conjunction with the accompanying drawings.

BRIEF DESCRIPTION OF THE DRAWINGS

FIG. 4 generally shows a network structure which includes a telephone network and a packet network and is applied with an embodiment of an integrated accounting system according to the present invention;

FIG. 5 is a time chart for explaining the operation of the embodiment shown in FIG. 4;

FIG. 8 is a system block diagram showing an embodiment of the telephone exchange of the embodiment shown in FIG. 4;

DESCRIPTION OF THE PREFERRED EMBODIMENTS

Figure 1:
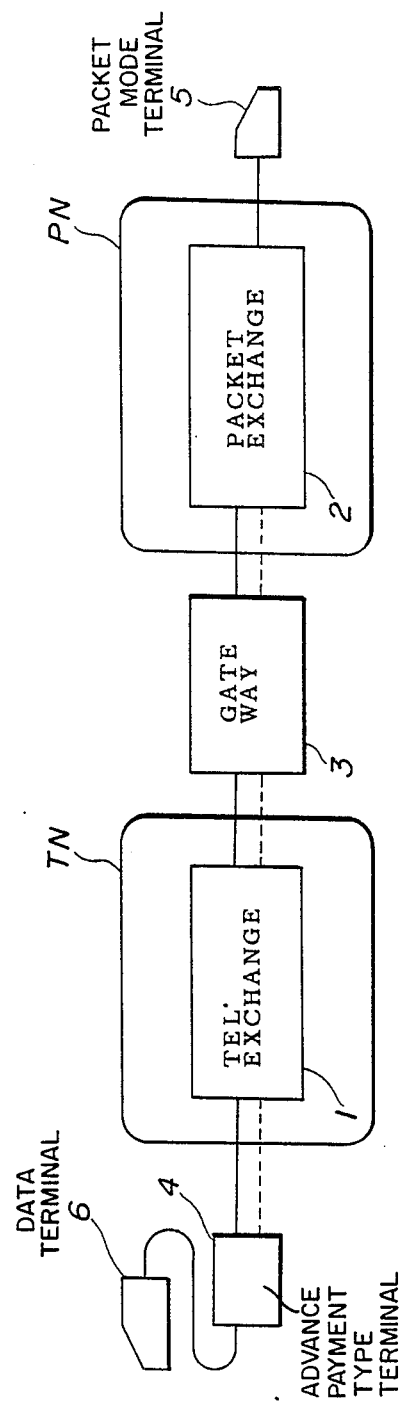
FIG. 1 generally shows an example of a conventional network structure which includes a telephone network and a packet network.
Figure 2:
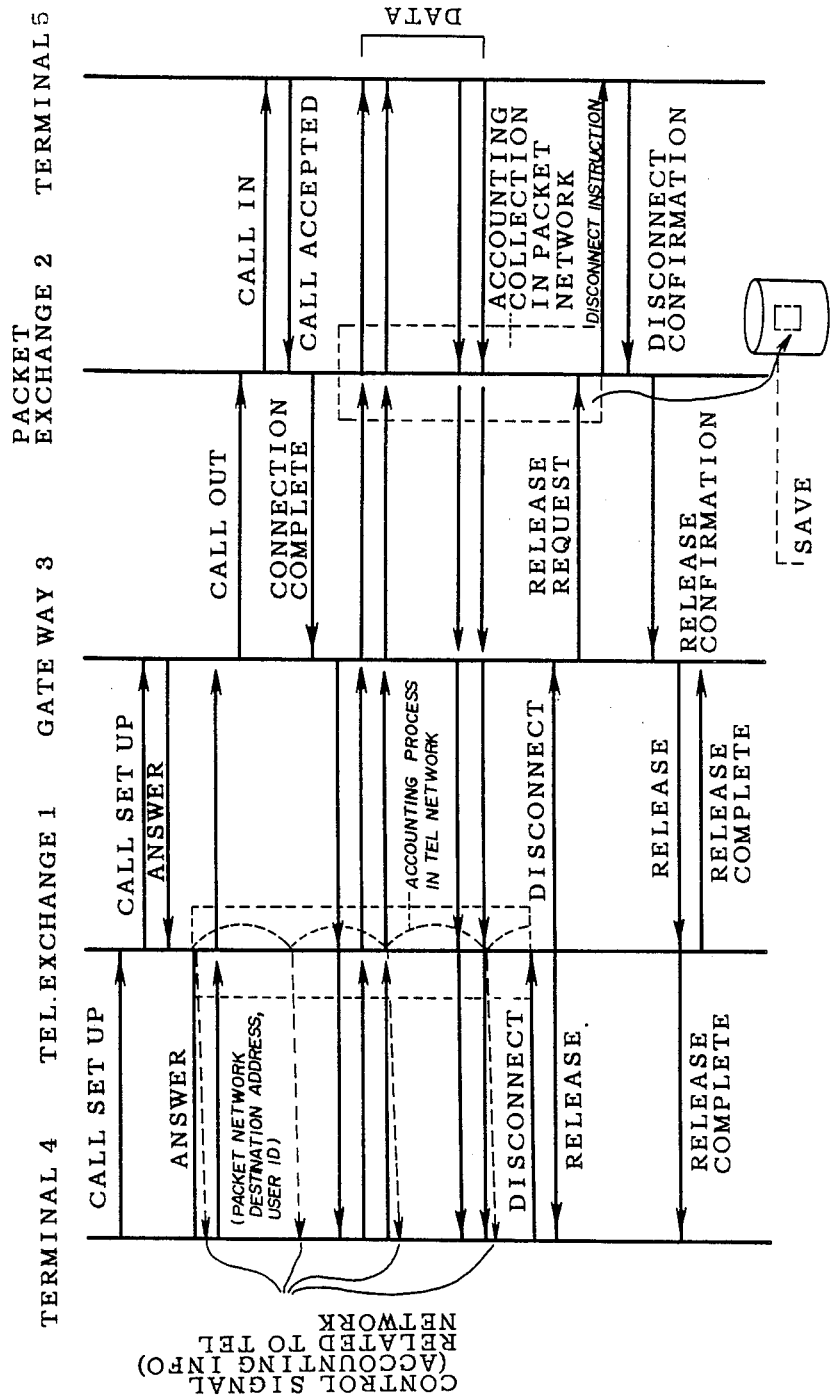
FIG. 2 is a time chart for explaining a conventional accounting method employing an independent accounting system.
Figure 3:
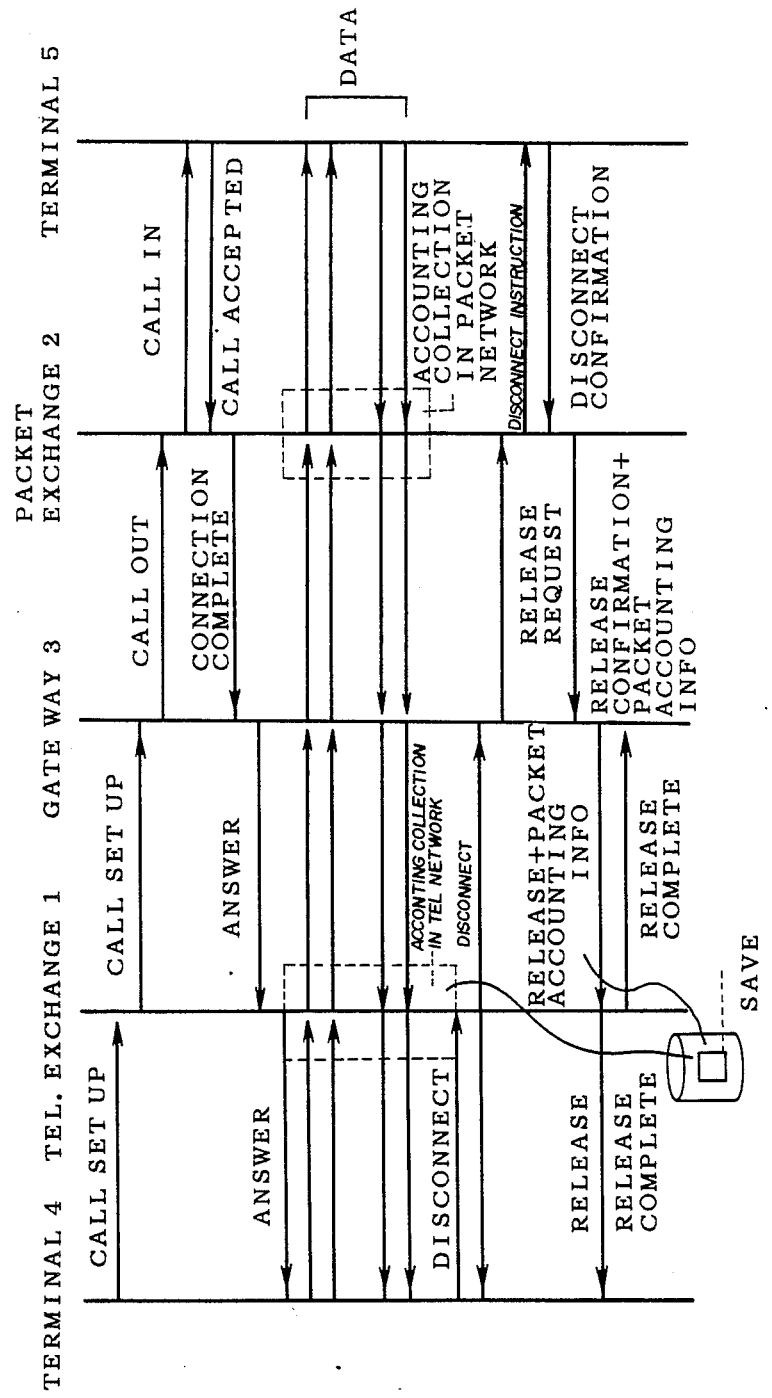
FIG. 3 is a time chart for explaining a conventional accounting method employing an integrated accounting system.

First, a description will be given of an embodiment of the integrated accounting system according to the present invention. FIG. 4 generally shows a network structure which includes a telephone network and a packet network and is applied with the embodiment of the integrated accounting system according to the present invention. The network structure shown includes a telephone network TN, a packet network PN, a telephone exchange 11 within the telephone network TN, a packet exchange 12 within the packet network PN, a gate way 13, an advance payment type terminal 14, a packet mode terminal 15, and a data terminal 16.

The packet exchange 12 keeps data indicative of a packet information quantity which corresponds to a predetermined accounting unit in the telephone network TN. The packet exchange 12 measures a communication data quantity within the packet network PN during a communication between the terminal 14 and the packet mode terminal 15 and outputs a control signal to make an accounting count-up instruction with respect to the gate way 13 when the measured communication data quantity amounts to the predetermined accounting unit. In addition, the packet exchange 12 initially outputs the control signal when a call out from the terminal 14 is detected.

When the gate way 13 receives the accounting count-up instruction, the gate way 13 sends it to the telephone exchange 11 which is in charge of the accounting as an accounting count-up instruction on a signal line within the telephone network TN. The telephone exchange 11 generates a control signal for every predetermined accounting unit which is dependent on a duration and distance of a communication within the telephone network TN to make an accounting count-up instruction with respect to the terminal 14. The telephone exchange initially generates the control signal when a call out from the terminal 14 is detected. Hence, the telephone exchange 11 sends to the terminal 14 the control signal generated therein and the control signal received from the gate way 13 as an advance payment information which is indicative of a sum of the accounting in the packet network PN and the accounting in the telephone network TN.

Accordingly, it is possible to know at the telephone exchange 11 in real-time the information on both the accounting in the telephone network TN and the accounting in the packet network PN, and the control signal can be sent to the terminal 14 based on this information. This means that the terminal 14 can collect money responsive to the control signal received from the telephone exchange 11 and the advance payment system can be realized in the network structure which includes the telephone network TN and the packet network PN.

Figure 6A:
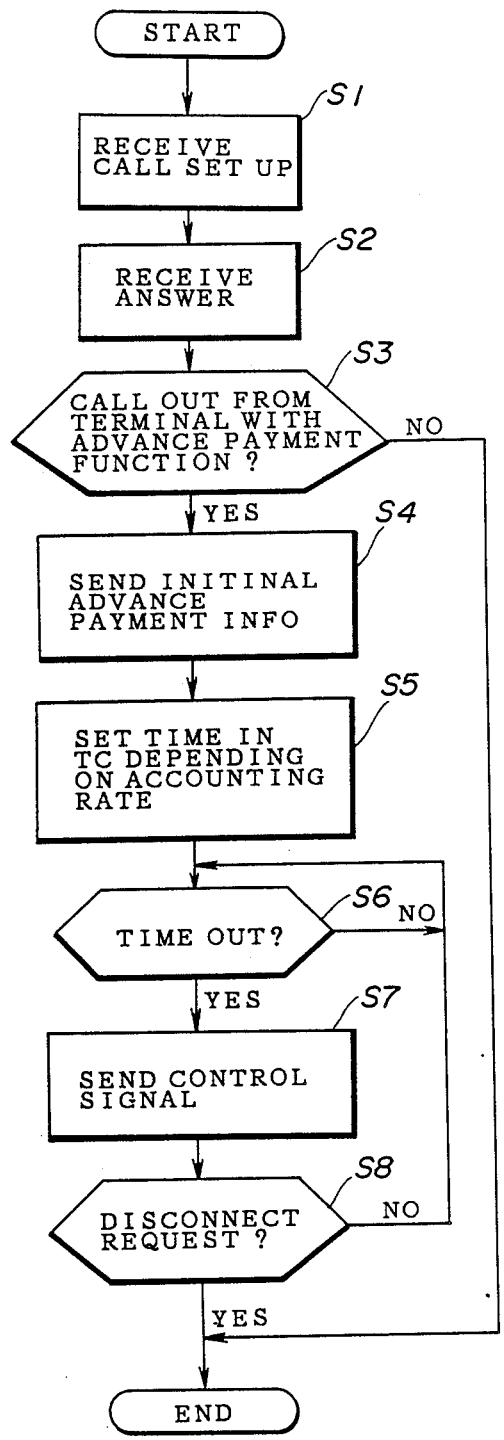
FIGS. 6A and 6B are flow charts respectively showing an operation of a telephone exchange in the embodiment shown in FIG. 4.
Figure 6B:
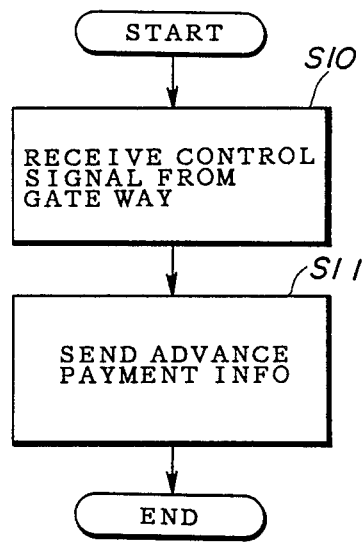

FIG. 5 is a time chart for explaining the operation of this embodiment, and FIGS. 6A and 6B are flow charts respectively showing an operation of the telephone exchange 11 in the embodiment shown in FIG. 4.

FIG. 6A shows a routine for sending the control signal to the terminal 14 so as to make a charge for the communication within the telephone network TN. A step S1 receives a call set up from the terminal 14, and transmits the call set up to the gate way 13. A step S2 receives an answer from the gate way 13 and transmits the answer to the terminal 14. A step S3 discriminates whether or not the call out is made from a terminal having an advance payment function. The process is ended when the discrimination result in the step S3 is NO. But in this embodiment, the terminal 14 has the advance payment function and the discrimination result in the step S3 is YES. Thus, the process advances to a step S4.

The step S4 sends a control signal to the terminal 14 as an initial advance payment information. Then, a step S5 sets a predetermined time in an internal accounting timer TC depending on an accounting rate within the telephone network TN. The following Table 1 shows an embodiment of the accounting rate which is employed in the telephone network TN and is described in an arbitrary unit.

TABLE 1

| Region | Accounting Rate |
| --- | --- |
| Within Same Region R1 | 1 Unit = 3 min. |
| From Region R1 to Region R2 | 1 Unit = 2 min. |
| From Region R1 to Region R3 | 1 Unit = 1 min. |

For example, in the case where the call is made from a region R1 to a region R2, one unit is equal to two minutes and the timer TC is set to the predetermined time which is two minutes. A step S6 discriminates whether or not the predetermined time set in the timer TC has elapsed. When the discrimination result in the step S6 becomes YES, a step S7 sends a control signal to the terminal 14 as an advance payment information. Then, a step S8 discriminates whether or not a disconnection is requested. The process returns to the step S6 when the discrimination result in the step S8 is NO, but the process ends when the discrimination result in the step S8 is YES.

On the other hand, FIG. 6B shows a routine for sending the control signal to the terminal 14 so as to make a charge for the communication within the packet network PN. This routine shown in FIG. 6B is carried out in parallel to the routine shown in FIG. 6A. In FIG. 6B, a step S10 receives a control signal from the gate way 13, and a step S11 sends the control signal to the terminal 14 as an advance payment information.

Figure 7A:
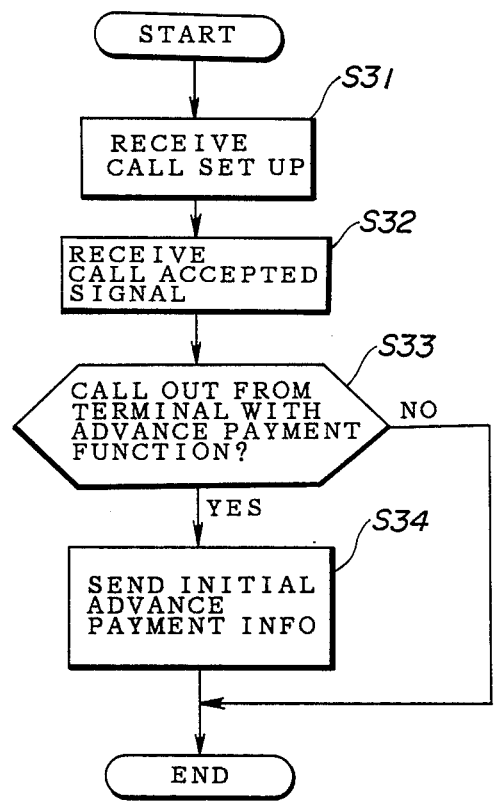
FIGS. 7A and 7B are flow charts respectively showing an operation of a packet exchange in the embodiment shown in FIG. 4.
Figure 7B:
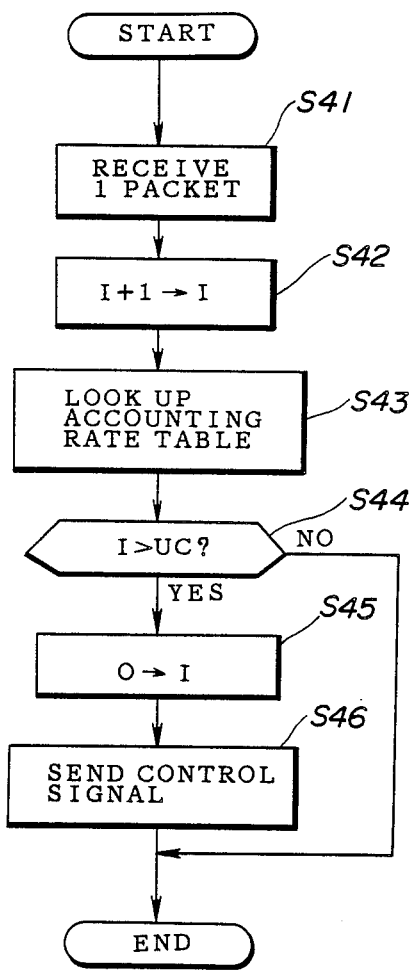

FIGS. 7A and 7B are flow charts respectively showing an operation of the packet exchange 13 in this embodiment. FIG. 7A shows a routine for sending the control signal to the gate way 13 so as to make a charge for the communication within the packet network PN. A step S31 receives a call set up from the terminal 14 via the telephone exchange 11 and the gate way 13, and transmits the call set up to the packet mode terminal 15. A step S32 receives a call accepted signal from the gate way 13 and transmits a connection complete signal to the gate way 13. A step S33 discriminates whether or not the call out is made from a terminal having an advance payment function. The process is ended when the discrimination result in the step S3 is NO. But in this embodiment, the terminal 14 has the advance payment function and the discrimination result in the step S33 is YES. Thus, the process advances to a step S34. The step S34 sends a control signal to the gate way 13 as an initial advance payment information, and the process is ended.

On the other hand, FIG. 7B shows a routine for measuring a communication data quantity within the packet network PN during a communication between the terminals 14 and 15 and for sending a control signal to the gate way 13 every time a measured communication data quantity reaches the predetermined accounting unit of the telephone network TN. This routine shown in FIG. 7B is carried out in parallel to the routine shown in FIG. 7A. In FIG. 7B, a step S41 receives one packet which is received from the packet mode terminal 15 or transmitted to the packet mode terminal 15. A step S42 renews a packet communication number I by incrementing the packet communication number I in an internal packet counter PC by one. A step S43 looks up an accounting rate table to find out a number of packets (hereinafter referred to as a packet number UC) which corresponds to one unit of the accounting rate employed in the telephone network TN. The following Table 2 shows an embodiment of the accounting rate employed in the packet network PN, where the unit is the same unit employed in the telephone network TN described before.

TABLE 2

| Kind of Packet | Packet number |
| --- | --- |
| 256 Bytes | 1 Unit = 100 Packets |
| 512 Bytes | 1 Unit = 55 Packets |

A step S44 discriminates whether or not the packet communication number I in the packet counter PC is greater than (or equal to) the packet number UC, and the process is ended when the discrimination result is NO. On the other hand, when the discrimination result in the step S44 is YES, a step S45 clears the packet communication number I in the packet counter PC to zero. Then, a step S46 sends a control signal to the gate way 13 as an advance payment information, and the process is ended.

When a disconnect request is made from the terminal 14, the telephone exchange 11 releases the terminal 14 and transmits the disconnect request to the gate way 13 as shown in FIG. 5. The gate way 13 sends a release request to the packet exchange 12 which sends a disconnect instruction to the packet mode terminal 15 responsive thereto. Hence, the packet mode terminal 15 sends a disconnect confirm signal to the packet exchange 12 which sends a release confirmation signal to the gate way 13 responsive thereto, and the gate way 13 sends a release signal to the telephone exchange 11. Responsive to the release signal, the telephone exchange 11 sends a release complete signal to the terminal 14 and the gate way 13.

FIG. 8 shows an embodiment of the telephone exchange 11. The telephone exchange 11 includes line concentrators 21, multiplexors 22, a line switch 23, a line processor 24, a digital switch module 25, a call processor 26, a channel controller 27, a main memory 28, a common channel signaling equipment 29, a channel-to-channel adaptor 30, an input/output equipment 31, a main memory 32, a channel controller 33, and a main processor 34.

The terminal 14 is coupled to the line switch 23 which is controlled by the line processor 24 via the corresponding line controller 21 and multiplexor 22. The digital switch module 25 is connected to the gate way 13 via a data line L. A signal line S connects the telephone exchange 11 to the terminal 14 and the gate way 13. The digital switch module 25 connects to the gate way 13 under the control of the call processor 26 and the main processor 34.

Figure 9:
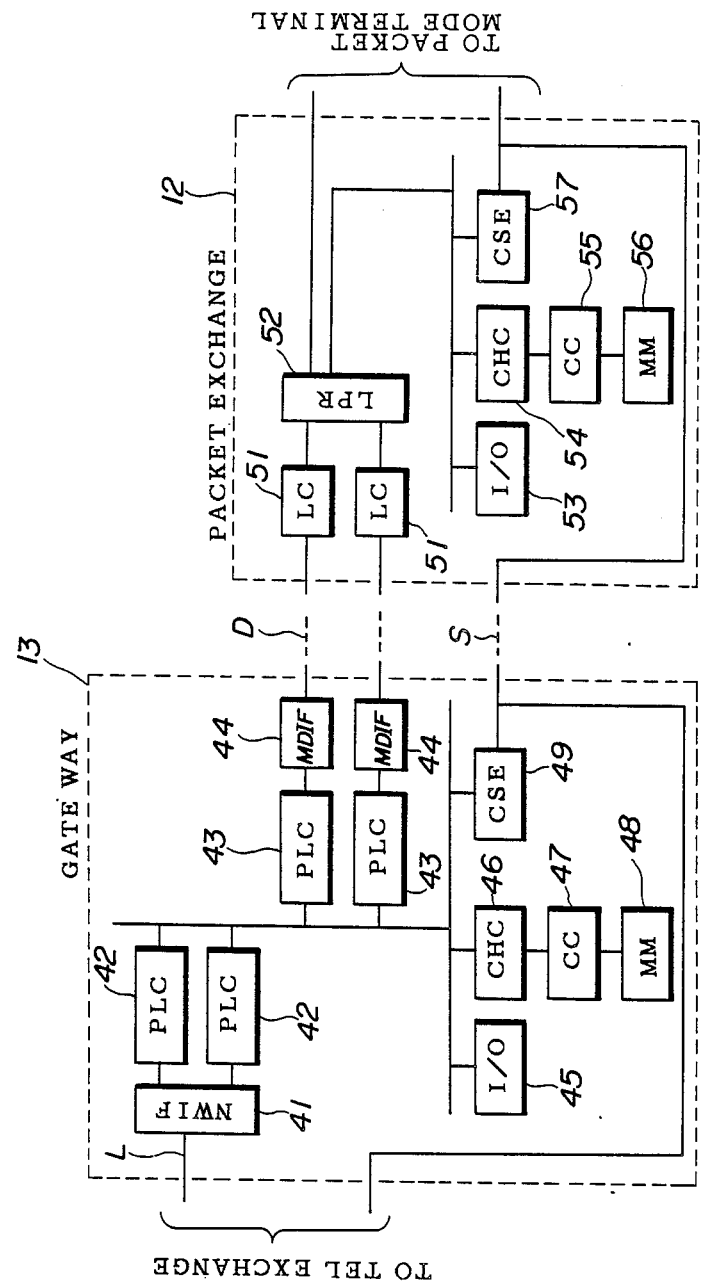
FIG. 9 is a system block diagram showing an embodiment of a gate way and a packet exchange of the embodiment shown in FIG. 4.

FIG. 9 shows an embodiment of the gate way 13 and the packet exchange 12. The gate way 13 includes a network interface 41, first packet link controllers 42, second packet link controllers 43, modem interfaces 44, an input/output equipment 45, a channel controller 46, a central controller 47, a main memory 48, and a common channel signaling equipment 49. The packet exchange 12 includes line circuits 51, a line processor 52, an input/output equipment 53, a channel controller 54, a central controller 55, a main memory 56, and a common channel signaling equipment 57. The gate way 13 is connected to the packet exchange 12 via discrete lines D and the signal line S. The line processor 52 and the common channel signaling equipment 57 of the packet exchange 12 are connected to the packet mode terminal 15.

In the gate way 13, the data packet obtained via the packet link controller 43 (or 42) is once stored in the memory 48 and transmitted through the other packet link controller 42 (or 43) under the control of the central controller 47. Similarly, in the packet exchange 12, the received and transmitting packet data are once stored in the memory 56 under the control of the central controller 55.

The control signal which is transferred on the signal line S for collecting the charge of the call at the terminal 14 in this embodiment has a predetermined number of bits with a signal format including a header portion and a data portion. The header portion includes the destination address, the length of the data portion and the like. The data portion includes the accounting information.

Figure 10:
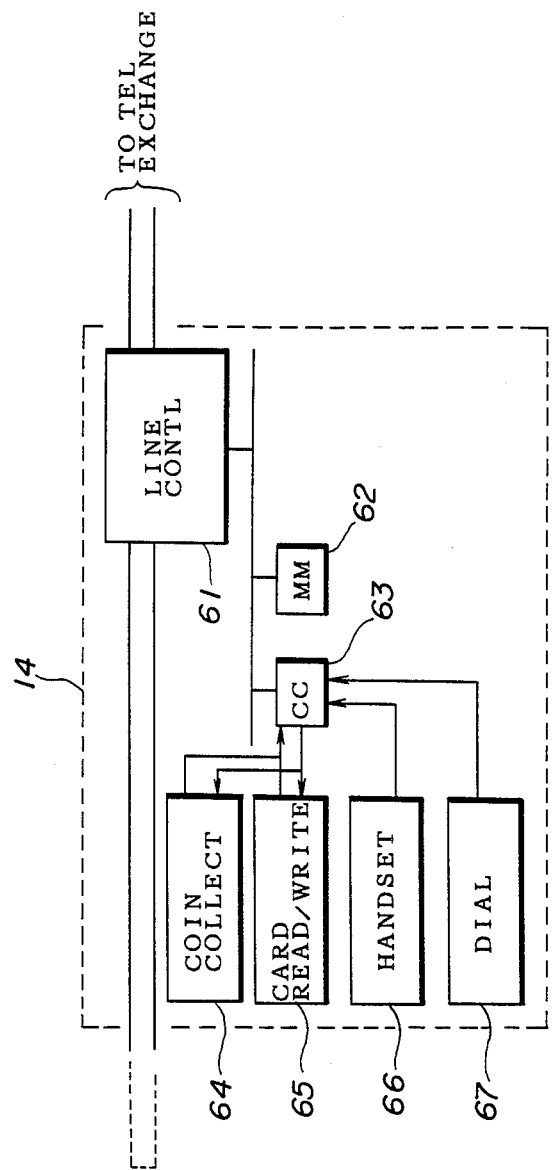
FIG. 10 is a system block diagram showing an embodiment of a terminal of the embodiment shown in FIG. 4.

FIG. 10 shows an embodiment of the terminal 14 having the advance payment function. The terminal 14 includes a line control unit 61, a memory 62, a central controller 63, a coin collection device 64, a card read/write device 65, a handset 66, and a dialing unit 67. When the control signal is received from the telephone exchange 11, the control signal is once stored in the memory 62 and the central controller 63 controls the coin collection device 63 and the card read/write device 65 depending on the accounting information contained in the data portion of the control signal.

Figure 11:
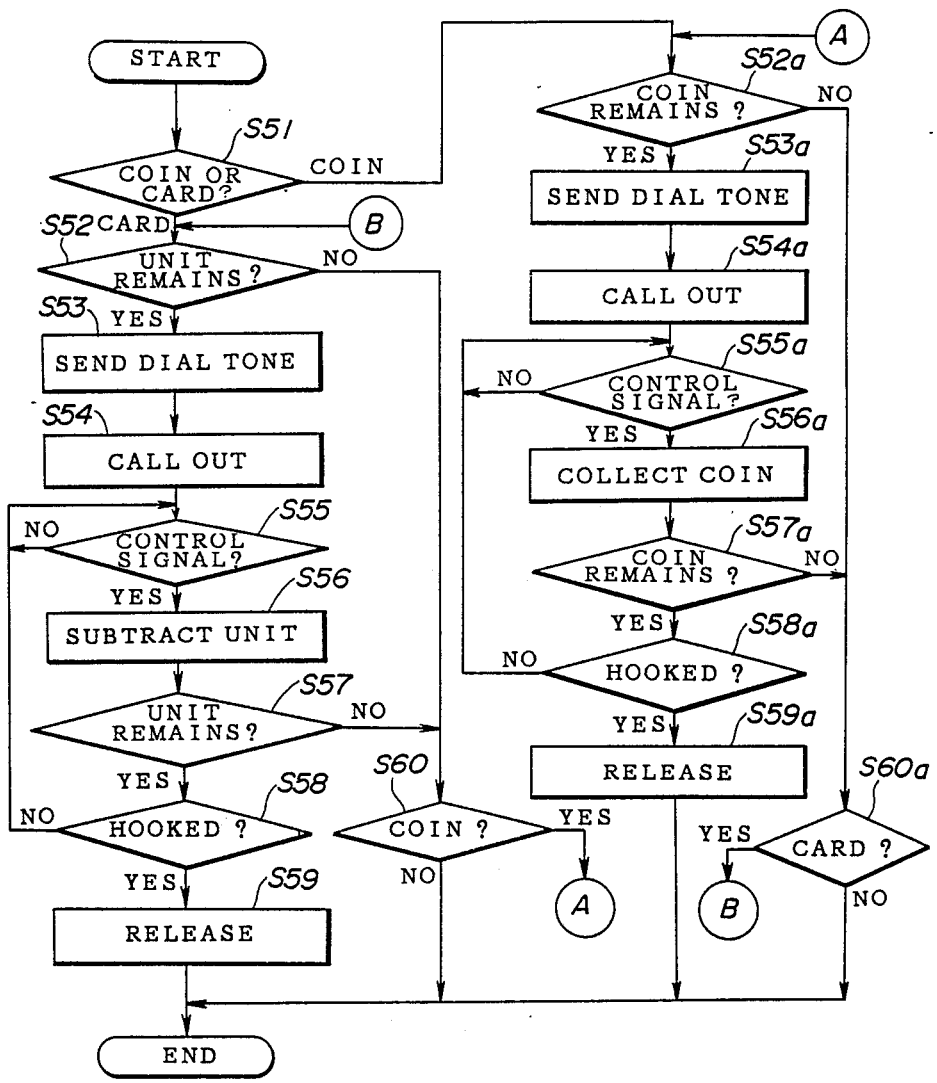
FIG. 11 is a flow chart for explaining an operation of the terminal shown in FIG. 10.

FIG. 11 is a flow chart showing the operation of the central controller 63 of the terminal 14. The process shown in FIG. 11 is started when the handset 66 is unhooked. A step S51 discriminates whether a coin is inserted into the coin collection device 63 or a card is inserted into the card read/write device 65. When the card is inserted into the card read/write device 65, a step S52 discriminates whether or not the inserted card is recorded with one or a plurality of the units described before. When the discrimination result in the step S52 is YES, a step S53 sends out a dial tone and waits for a destination to be dialed on the dialing unit 67. A step S54 makes a call out responsive to the dialed destination and sets a communication path. The line control unit 61 receives an answer from the destination. A step S55 discriminates whether or not a control signal is received from the telephone exchange 11. When the discrimination result in the step S55 is YES, a step S56 subtracts one unit from the card on the card read/write device 65. A step S57 discriminates whether or not the inserted card is still recorded with one or a plurality of the units. When the discrimination result in the step S57 is YES, a step S58 discriminates whether or not the handset 66 is hooked. When the discrimination result in the step S58 is NO, the process returns to the step S55. A step S59 releases the communication path and the process ended when the discrimination result in the step S58 is YES.

On the other hand, when the discrimination result in the step S52 or S57 is NO, a step S60 discriminates whether or not a coin is inserted into the coin collection device 64. The process is ended when the discrimination result in the step S60 is NO.

When the step S51 discriminates that the coin is inserted into the coin collection device 64 or when the discrimination result in the step S60 is YES, the process advances to a step S52a. The steps S52a through S60a substantially correspond to the steps S52 through S60 except that the central controller 63 controls the coin collection device 64 in place of the card read/write device 65. That is, the step S56a collects one coin corresponding to one unit, the step S57a discriminates whether or not one or a plurality of coins still remain in the coin collection device 64, and the step S60a discriminates whether or not a card is inserted into the card read/write device 65. When the discrimination result in the step S60a is YES, the process returns to the step S52.

In the embodiment described heretofore, the control signal for controlling the advance payment at the terminal 14 is transmitted on the signal line S which is independent of the data line D. But in a modification of the embodiment, the control signal for controlling the advance payment at the terminal 14 may be transmitted on the data line D together with the data.

The terminal 14 may be a coin type public telephone set, a card type public telephone set or the like. For example, the card type public telephone set may use as the card an integrated circuit (IC) card, a magnetic card including a magnetic bubble memory and the like. Furthermore, the card type public telephone set usually has a function of collecting the advance payment by coins and/or the card so that coins may be used to make up for an insufficient number of units remaining on the card in use, as in the case of the terminal 14 shown in FIG. 10.

Further, the present invention is not limited to these embodiments, but various variations and modifications may be made without departing from the scope of the present invention.

What is claimed is:

1. An integrated accounting system for a network structure which includes a telephone network and a packet network, said integrated accounting system comprising:

a telephone exchange within the telephone network;
a packet exchange within the packet network;
a gate way coupling said telephone exchange and said packet exchange;
a first terminal having an advance payment function and coupled to said telephone exchange, said first terminal including collecting means for collecting an amount of money;

a second terminal coupled to said packet exchange, said second terminal being a packet mode terminal;

said packet exchange including means for measuring a communication data quantity within the packet network during a communication between said first and second terminals, means for sending a control signal to said gate way every time a measured communication data quantity reaches a predetermined accounting unit of the telephone network, and means for initially sending the control signal when a call out from said first terminal is detected;

said telephone exchange including means for generating a control signal for every said predetermined accounting unit which is dependent on a duration and distance of a communication within the telephone network, means for sending the control signal generated therein and the control signal received from said gate way to said first terminal, and means for initially sending the control signal when a call out from said first terminal is detected; and said collecting means of said first terminal collecting the amount of money responsive to the control signal received from said telephone exchange.

2. The integrated accounting system as claimed in claim 1 wherein said collecting means of said first terminal collects the amount of money by collecting coins inserted into said first terminal.

3. The integrated accounting system as claimed in claim 1 wherein said collecting means of said first terminal collects the amount of money by subtracting units from a card which has units equivalent to an arbitrary amount of money recorded thereon.

4. The integrated accounting system as claimed in claim 3 wherein said card is selected from a group which includes at least an integrated circuit card and a magnetic card.

5. The integrated accounting system as claimed in claim 1 wherein said collecting means of said first terminal collects the amount of money by collecting coins inserted into said first terminal and/or by subtracting units from a card which has units equivalent to an arbitrary amount of money recorded thereon.

6. The integrated accounting system as claimed in claim 1 wherein said control signal is transmitted on a signal line which is independent of a data line on which data is transmitted.

7. The integrated accounting system as claimed in claim 1 wherein said control signal is transmitted on a data line together with data.

8. The integrated accounting system as claimed in claim 1 wherein said means of said packet exchange for initially sending the control signal detects whether or not the call out is received from a terminal having an advance payment function and sends the control signal to said gate way only when the call out is received from the terminal having the advance payment function.

9. The integrated accounting system as claimed in claim 1 wherein said means of said packet exchange for measuring the communication data quantity counts a number of packets transmitted and received in the packet network.

10. The integrated accounting system as claimed in claim 9 wherein said means of said packet exchange for sending the control signal sends the control signal to said gate way when a counted number of packets reaches a predetermined number which corresponds to one predetermined accounting unit of the telephone network.

11. The integrated accounting system as claimed in claim 10 wherein said means of said packet exchange for sending the control signal further includes means for looking up a table which stores said predetermined number for a plurality of kinds of packets having mutually different number of bytes.

12. The integrated accounting system as claimed in claim 1 wherein said means of said telephone exchange for initially sending the control signal detects whether or not the call out is received from a terminal having an advance payment function and sends the control signal to said first terminal only when the call out is received from the terminal having the advance payment function.

13. The integrated accounting system as claimed in claim 1 wherein said means of said telephone exchange for generating the control signal detects a duration of the communication within the telephone network.

14. The integrated accounting system as claimed in claim 13 wherein said means of said telephone exchange for sending the control signal sends the control signal to said first terminal when a detected duration reaches a predetermined time which corresponds to one predetermined accounting unit of the telephone network.

15. The integrated accounting system as claimed in claim 14 wherein said means of said telephone exchange for sending the control signal further includes means for looking up a table which stores said predetermined time for a plurality of kinds of accounting rates dependent on the distance of the communication within the telephone network.

* * * * *

UNITED STATES PATENT AND TRADEMARK OFFICE
CERTIFICATE OF CORRECTION

PATENT NO. : 4,933,931

DATED : June 12, 1990

INVENTOR(S) : Yuji KOKUBO

It is certified that error appears in the above-identified patent and that said Letters Patent is hereby corrected as shown below:

[57] ABSTRACT, line 19, change "acocunting" to --accounting--.

Col. 3, line 24, delete "the".

Signed and Sealed this

Twenty-fifth Day of June, 1991

Attest:

HARRY F. MANBECK, JR.

Attesting Officer

Commissioner of Patents and Trademarks